May 11, 1948. P. K. BRESEE 2,441,392
COMBINED CONTAINER AND MIXER FOR CONCRETE, MORTAR,
OR OTHER BUILDING MATERIAL
Filed Feb. 12, 1945
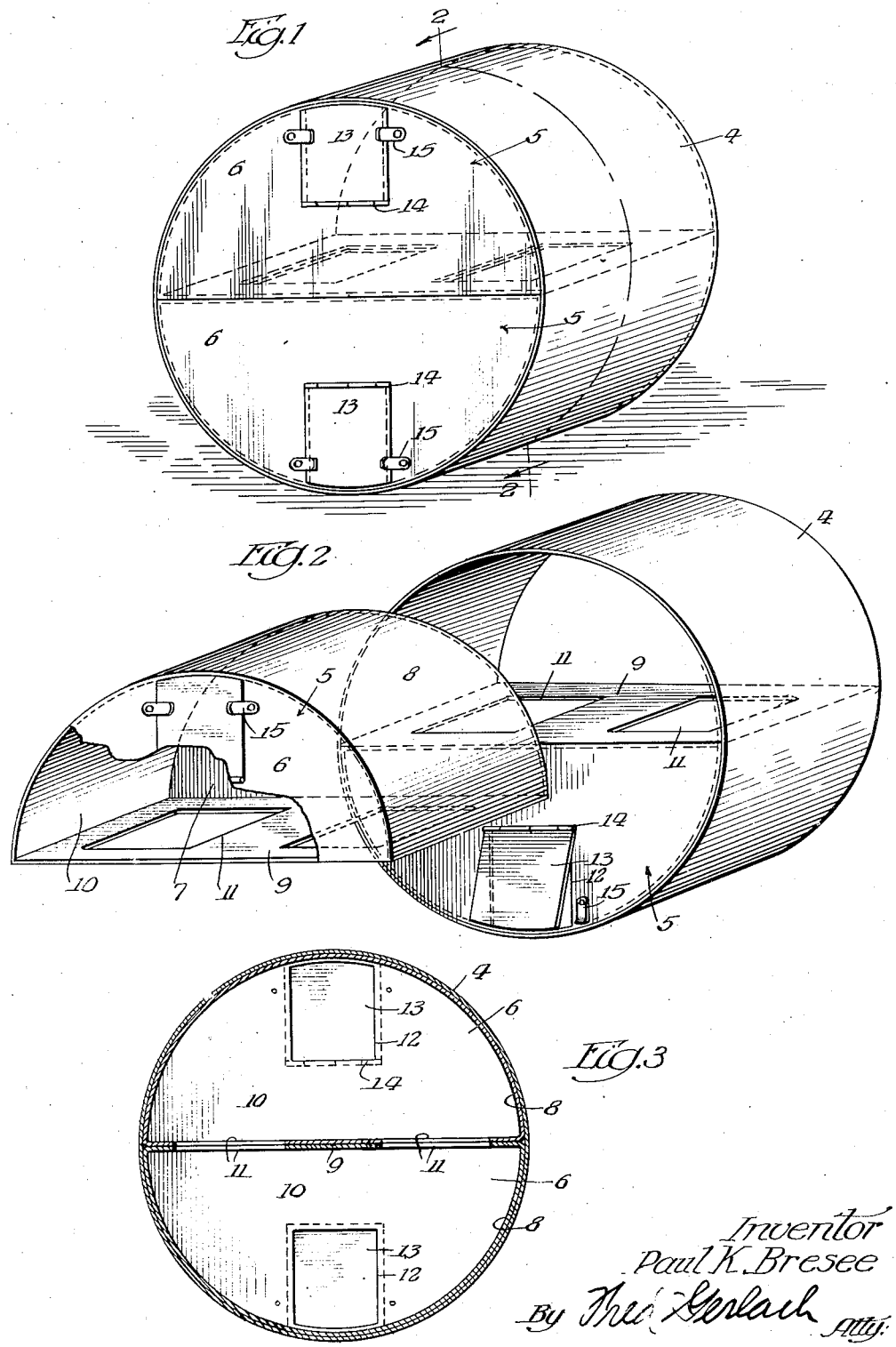
Inventor
Paul K. Bresee
By Theo. Gerlach, Atty.

Patented May 11, 1948

2,441,392

UNITED STATES PATENT OFFICE 2,441,392

COMBINED CONTAINER AND MIXER FOR CONCRETE, MORTAR, OR OTHER BUILDING MATERIAL

Paul K. Bresee, Champaign, Ill.

Application February 12, 1945, Serial No. 577,540

5 Claims. (Cl. 259—173)

1

The present invention relates generally to combined containers and mixers. More particularly the invention relates to that type of combined container and mixer which is primarily designed for use in connection with the handling of concrete, mortar, or other building material.

One object of the invention is to provide a combined container and mixer of this type which is an improvement upon, and has certain inherent advantages over, previously designed combined containers and mixers and is characterized by the fact that it is so constructed and arranged that it is adapted to be charged with a predetermined amount of the desired material by the material producer and is further adapted after shipment by the producer to the user to have the required or necessary amount of water added to the charge and then to be rolled over any suitable surface such as the floor or ground, in order to effect an intimate mixing of the components of the charge and the water.

Another object of the invention is to provide a combined container and mixer of the aforementioned type which comprises a sleeve-like shell and in addition a plurality of complemental container sections which fit snugly within, and are arranged in series form around, the shell, serve to provide compartments for the charge of concrete, mortar or other building material, have abutting walls with registering openings therein, and are adapted in connection with a rolling operation to have the charge pass successively through their compartment forming interiors.

A further object of the invention is to provide a combined container and mixer of the last mentioned character in which the shell is cylindrical and open ended and the container sections are two in number and semi-cylindrical and have door-closed openings in certain of the end walls thereof whereby the charge may be inserted into the compartments and then after a mixing operation removed therefrom.

A still further object of the invention is to provide a combined container and mixer of the type under consideration which effectively and efficiently fulfills its intended purpose, may be manufactured at a low and reasonable cost, is simple and durable so far as construction is concerned, is so designed that it may be constructed of waterproof cardboard and when so constructed may be destroyed after use, reduces or eliminates the tedium of hand mixing, and permits the user to mix the charge of concrete, mortar or other building material in a neat or orderly manner.

Other objects of the invention and the various

2 advantages and characteristics of the present combined container and mixer will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a combined container and mixer embodying the invention;

Figure 2 is a perspective showing one of the semi-cylindrical container sections removed from the cylindrical open ended shell and with certain parts thereof broken away for purposes of illustration; and Figure 3 is a cross section taken on the line 3—3 of Figure 1 and illustrating in detail the manner in which the walls of the container sections which abut against one another and have the registering openings therein permit the charge to pass successively through the compartments in connection with a rolling operation and serve as baffles for effecting an intimate mixing of the charge and the water as the latter pass from one compartment to the other.

The combined container and mixer which is shown in the drawing constitutes the preferred form or embodiment of the invention. It is designed primarily for use in handling and mixing concrete, mortar or other building material, and as its component parts comprises a shell 4 and a pair of complemental semi-cylindrical container sections 5. The shell and container sections are formed of metal, wood, waterproof cardboard or heavy paper or any other suitable material. It is contemplated that the combined container and mixer will be charged with a predetermined amount of the desired building material by the material producer and then shipped by the producer to the user. It is also contemplated that the user in connection with use of the combined container and mixer will add the required or proper amount of water to the charge and then roll the combined container and mixer over a level surface, such as the floor or ground, in order to effect the proper mixing of the components of the charge and the water. The material producer in connection with charging of the combined container and mixer leaves sufficient space to permit the user to add the desired or necessary amount or quantity of water to the charge.

The shell 4 is truly cylindrical and has both ends thereof open, as best shown in Figure 2 of the drawing. It surrounds and serves as a housing for the semi-cylindrical container sections 5 and preferably has a smooth external and internal periphery.

The container sections 5 are adapted to fit snugly within the cylindrical open ended shell 4 and are preferable the same length as the shell. In order that there is sufficient snugness between the sections and the shell so as to cause the sections to roll with the shell when the latter is rolled about its axis the radius of the sections is the same as the internal radius of the shell. When the sections are in place within the shell they are arranged so that their ends terminate adjacent the end edges of the shell. Each of the semi-cylindrical container sections 5 comprises a pair of laterally spaced semicircular end walls 6 and 7, a semi-cylindrical side wall 8 and a chordal wall 9 and these walls together define a compartment 10 for a portion or part of the charge of material to be mixed. The end margins of the side walls 8 of the container sections 5 are suitably joined to the curved edges of the end walls 6 and 7 and the end margins of the chordal walls 9 are joined to the straight margins of the end walls and the side margins of the chordal walls are suitably joined to the side margins of the side walls 8. When the two semi-cylindrical container sections 5 are in place within the cylindrical open ended shell 4 the chordal walls 9 are in abutting relation. The ends of the walls 9 are provided with registering square openings 11 in order to effect communication between the compartments within the container sections. Access to the compartments 10 is provided by way of openings 12 in the end walls 6. These openings are normally closed by doors 13 which have hinges 14 whereby they may be swung back and forth between their open and closed positions with respect to the access openings 12. Latches 15 are pivotally connected to the end walls 6 at points adjacent the openings 12 and serve to hold the doors 13 in their closed position whereby they serve to seal or close the compartments 10. When it is desired to charge the compartments with concrete, mortar or other building material the combined container and mixer is placed in a position wherein the axis thereof extends vertically and the end walls 6 of the container sections are uppermost. Thereafter the latches 15 are released and the doors 13 are swung upwards into their open position so as to provide access to the compartments 10 via the access openings 12. After partial charging of the compartments the doors 13 are closed and then secured in place by swinging the latches 15 into their operative position. After closing of the doors the combined container and mixer may be shipped by the material producer to the user.

When it is desired to use the combined container and mixer the user introduces into either or both of the compartments 10 the proper amount of water for admixture with the charge of building material in the compartments. After introduction of the proper or desired amount of water the combined container and mixer is placed in a horizontal position, i. e., in a position wherein the axis thereof extends horizontally. Thereafter the combined container and mixer is rolled over any level surface either in one direction or back and forth. In connection with rolling the charge of building material passes successively through the compartments and the components of the charge are intimately mixed with each other and the water. In connection with a rolling operation the chordal walls 9 of the container sections 5 serve as baffles for the charge and baffle the latter as it passes successively through the compartments 10 and thus effect or produce the desired mixing of the components of the charge and the water. After the charge and the water are mixed to the desired extent the doors 13 are swung into their open position so as to permit the mixed charge to be discharged from the compartments via the access openings 12.

The herein described combined container and mixer is essentially simple in design and hence may be produced at a low and reasonable cost. It effectively and efficiently serves its intended purpose and assures an intimate mixing of the components of the charge and the water due to the fact that the chordal walls 9 of the container sections 5 serve as baffles. If the combined container and mixer is formed of waterproof cardboard or heavy paper it may be destroyed after use. The combined container and mixer reduces or eliminates the tedium of hand mixing concrete, mortar or other building material and permits the charge to be mixed in a neat manner. It also enables the user to mix predetermined or desired quantities of building material.

Whereas the combined container and mixer has been described as comprising two semi-cylindrical container sections it is to be understood that more than two sections may be used and in such case the sections will be sector shaped in cross section and arranged in an annular series within the cylindrical open ended shell. It is also to be understood that the invention is not to be restricted to the details set forth since these may be modified within the scope of the appended claims without departing from the spirit and scope of the invention.

Having thus described the invention, what I claim as new and desire to secure by Letters Patent is:

1. As a new article of manufacture, a combined container and mixer designed for use in handling building material and the like, adapted to be rolled on a surface to effect mixing of the material, and comprising a sleeve-like shell, and in addition a plurality of complemental compartment forming container sections for the material, fitting within, and arranged in series form around, the shell, embodying abutting walls with registering openings therein to effect communication between the compartments, and adapted in connection with a rolling operation to have the material therein pass successively through the compartments.

2. As a new article of manufacture, a combined container and mixer designed for use in handling building material and the like, adapted to be rolled on a surface to effect mixing of the material, and comprising a sleeve-like shell, and a plurality of complemental compartment forming container sections for the material, fitting within, and arranged in series form around, the shell, embodying abutting walls with registering openings therein to effect communication between the compartments, and in addition end walls with door-closed access openings therein leading to the compartments, and adapted in connection with a rolling operation to have the material therein pass successively through the compartments.

3. As a new article of manufacture, a combined container and mixer designed for use in handling building material and the like, adapted to be rolled on a surface to effect mixing of the material, and comprising a cylindrical open ended shell, and in addition a plurality of complemental compartment forming container sections for the material, fitting snugly within, and arranged in series form around, the shell, embodying abutting walls with registering openings therein to effect communication between the compartments, and adapted in connection with a rolling operation to have the material therein pass successively through the compartments.

4. As a new article of manufacture, a combined container and mixer designed for use in handling building material and the like, adapted to be rolled on a surface to effect mixing of the material, and comprising a cylindrical open ended shell, and in addition a pair of complemental semi-cylindrical compartment forming container sections fitting snugly within the shell, having registering openings in the chordal walls thereof to effect communication between the compartments, and adapted in connection with a rolling operation to have the material pass successively through said compartments.

5. As a new article of manufacture, a combined container and mixer designed for use in handling building material and the like, adapted to be rolled on a surface to effect mixing of the material, and comprising a cylindrical open ended shell and a pair of complemental oppositely positioned compartment forming semi-cylindrical container sections for the material, fitting snugly within the shell, having registering openings in the chordal walls thereof to effect communication between the compartments and also having door-closed access openings in certain of the end walls thereof, and adapted in connection with a rolling operation to have the material pass successively from one compartment to the other.

PAUL K. BRESEE.

REFERENCES CITED

The following references are of record in the file of this patent:

UNITED STATES PATENTS

| Number | Name | Date |
| --- | --- | --- |
| 75,205 | Shaw et al. | Mar. 3, 1868 |
| 966,639 | Arnold | Aug. 9, 1910 |
| 977,679 | Robbins | Dec. 6, 1910 |
| 2,138,550 | MacLellan | Nov. 29, 1938 |
| 2,288,440 | Evans | June 30, 1942 |

FOREIGN PATENTS

| Number | Country | Date |
| --- | --- | --- |
| 3,431 | Great Britain | Feb. 11, 1910 |
| 44,984 | Switzerland | Aug. 31, 1908 |